Patented June 24, 1947

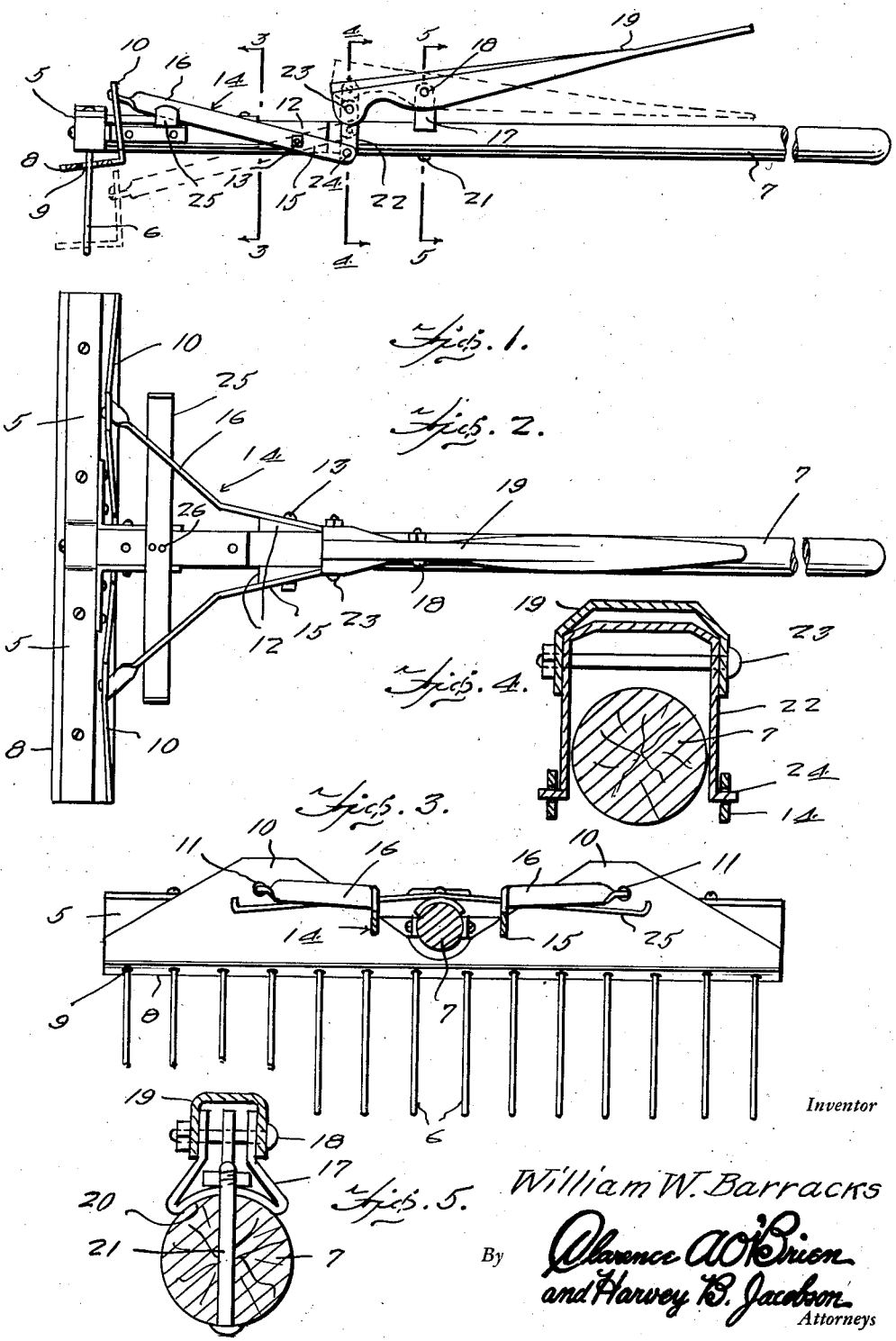

2,422,712

UNITED STATES PATENT OFFICE 2,422,712

GARDEN AND LAWN HAND RAKE

William W. Barracks, College Point, N. Y.

Application February 24, 1944, Serial No. 523,618

3 Claims. (Cl. 56—400.10)

This invention relates to certain new and useful improvements in self-clearing rakes of the type commonly employed for garden and lawn purposes and wherein manually operable means is provided for forcing leaves, trash and the like off of the teeth or prongs of the rake as may be found necessary from time to time.

A more specific object of the present invention is to provide a rake of the above kind embodying a teeth-clearing means of simple construction that may be readily and economically manufactured and installed and which may be readily and easily operated to effectively clear the teeth of the rake.

Another object of the invention is to provide, in a rake of the above kind, a novel form of teeth-clearing plate and operating means therefor.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a side elevational view, partly broken away and in section, of a rake provided with teeth-clearing means constructed in accordance with the present invention.

Figure 2 is a top plan view thereof.

Figure 3 is a transverse section taken on line 3—3 of Figure 1, and drawn on an enlarged scale.

Figure 4 is an enlarged transverse section taken on line 4—4 of Figure 1, and

Figure 5 is an enlarged transverse section taken on line 5—5 of Figure 1.

Referring in detail to the drawings, the illustrated embodiment of the invention includes a rake proper comprising a head 5 provided with a plurality of spaced depending teeth or prongs 6 and disposed transversely of and rigidly secured to the forward end of an elongated handle 7.

The rake proper is provided with a novel form of teeth-clearing device including a clearing plate 8 having a plurality of spaced openings 9 that loosely receive the teeth 6 so that the plate 8 is freely slidable along said teeth. The clearing plate 8 is provided along its rear longitudinal edge with upstanding flanges 10 disposed at opposite sides of the handle 7 and provided intermediate the ends thereof with openings 11. Fastened to opposite sides of the handle 7 a short distance rearwardly of the head 5 are tapered blocks 12 whose outer faces diverge forwardly and to which are pivoted at 13 levers 14 having forwardly diverging portions 15 that flatly contact the outer faces of the block 12. The pivot 13 is located nearer the rear ends of levers 14 than the forward ends thereof, and the longer forward arms of said levers have abruptly forwardly diverging end portions 16 whose forward ends are loosely engaged and secured in the openings 11 of the flanges 10. A bracket 17 is secured on the upper side of the handle 7 a short distance rearwardly of the rear ends of levers 14, and pivoted upon this bracket, as at 18, is an elongated hand lever 19. The bracket 17 preferably consists of a substantially U-shaped metal strip having an arched intermediate portion 20 which fits upon the handle 7 and is bolted thereto, as at 21. The lever 19 is mainly of channel form in cross section and receives the legs of the bracket 17 between the flanges thereof, the pivot 18 extending through said flanges and the upper ends of the bracket 17, as shown in Figure 5. The pivot 18 is located nearer the forward end of lever 19 than the rear end of the latter, and the shorter forward arm of lever 19 is operatively connected to the rear ends of levers 14 by means of links 22 that preferably comprise the end portions of a U-shaped strip of metal whose intermediate portion is received within the forward end of lever 19, as shown in Figure 4, a pivot bolt 23 being passed through the flanges of lever 19 and the ends of the links 22 that are connected together. The other or lower ends of the links 22 are pivoted at 24 to the rear ends of levers 14. Disposed transversely of and secured intermediate its ends upon the handle 7 at a point between the head 5 and the pivot 13 of levers 14 is an elongated leaf spring 25 that is disposed beneath the forward end portions of levers 14 and projects laterally beyond the latter. The spring 25 normally assumes a substantially straight condition, as shown, so as to swing the forward ends of the levers 14 upwardly and thereby normally yieldingly position the clearer plate 8 adjacent the under side of the head 5. When thus positioned, the clearer plate 8 is out of the way and offers no interference to the use of the rake proper in the ordinary way. Upon pressing the rear end of lever 19 downwardly or toward the handle 7, levers 14 are swung against the action of spring 25 so as to slide the clearer plate 8 downwardly to a point adjacent the lower ends of the teeth 6, thereby forcing any leaves, trash or the like downwardly off said teeth. As soon as the lever 19 is released, the spring 25 returns the parts to their normal positions, as indicated by full lines in Figure 1. The downward position of the clearer plate 8 and the corresponding positions of the parts connected thereto are indicated by dotted lines in Figure 1, at which time the ends of the spring 25 are flexed downwardly. The loose engagement of the ends of levers 14 in flanges 10 and the loose reception of the rake teeth 6 in the openings 9 of clearer plate 8 allow for any slight change in angular relation of parts that takes place when the clearer plate is shifted from one position to the other. Any means may be provided at 26 for securing the spring 25 to the handle 7. It will be noted that the flanges 10 normally project above the handle and that the lever 19 is provided upon the upper side of the handle, a very desirable arrangement. The forward ends of the levers 14 are reduced to engage in the openings 11 of the flanges 10, said ends being bent or clinched to maintain the levers connected to said flanges 10.

From the foregoing description, it is believed that the construction and operation, as well as the advantages of the present invention, will be readily understood and appreciated by those skilled in the art. Minor changes may be made in details of construction illustrated and described, such as fairly fall within the spirit and scope of the invention as claimed.

What I claim is:

1. In combination with a rake proper comprising an elongated handle and a head extending transversely of and rigidly secured to the forward end of the handle and provided with a plurality of spaced depending teeth, a clearer plate having a plurality of openings loosely receiving the teeth and freely slidable along the latter, said clearer plate being provided on its rear edge with a pair of upstanding flanges disposed at opposite sides of the handle and provided with openings, a pair of levers pivoted intermediate their ends upon and at opposite sides of the handle for vertical swinging movement about an axis transverse to the handle, said levers being of straight form in side elevation and having forwardly diverging forward arms provided with reduced forward ends loosely engaged and secured in the openings of said flanges, a hand lever pivotally mounted intermediate its ends upon the forward portion of the handle rearwardly of said levers for vertical rocking movement about an axis transverse to the handle, the rear ends of said pair of levers extending rearwardly adjacent and beneath the forward end of said hand lever, short links operatively connecting the forward end of said hand lever with the rear ends of said pair of levers, and a spring carried by the handle and acting to normally yieldingly hold the clearer plate elevated in position adjacent the under side of the head.

2. In combination with a rake proper comprising an elongated handle and a head extending transversely of and rigidly secured to the forward end of the handle and provided with a plurality of spaced depending teeth, a clearer plate having a plurality of openings loosely receiving the teeth and freely slidable along the latter, said clearer plate being provided on its rear edge with a pair of upstanding flanges disposed at opposite sides of the handle and provided with openings, a pair of levers pivoted intermediate their ends upon and at opposite sides of the handle for vertical swinging movement about an axis transverse to the handle, said levers being of straight form in side elevation and having forwardly diverging forward arms provided with reduced forward ends loosely engaged and secured in the openings of said flanges, a hand lever pivotally mounted intermediate its ends upon the forward portion of the handle rearwardly of said levers for vertical rocking movement about an axis transverse to the handle, the rear ends of said pair of levers extending rearwardly adjacent and beneath the forward end of said hand lever, short links operatively connecting the forward end of said hand lever with the rear ends of said pair of levers, and a spring carried by the handle and acting to normally yieldingly hold the clearer plate elevated in position adjacent the under side of the head, said spring comprising an elongated resilient leaf disposed and rigidly secured intermediate its ends upon the handle and projecting laterally beyond and beneath the forward arms of the first-named levers so as to engage and act upon the latter.

3. In combination with a rake proper comprising a head having a plurality of spaced depending teeth, and an elongated handle rigidly secured to the intermediate portion of the head, a clearer plate vertically movable along the teeth, a pair of levers arranged at opposite sides of and pivoted to the handle for vertical swinging movement about an axis transverse to the handle and having forwardly diverging forward end portions loosely connected at their forward ends to the clearer plate, a hand lever pivoted intermediate its ends upon the forward portion of the handle rearwardly of said levers for vertical rocking movement upon an axis transverse to the handle, the rear ends of said levers extending adjacent and beneath the forward end of said hand lever, short links operatively connecting said pair of levers with said hand lever, and a leaf spring fixed intermediate its ends upon said handle and extending transversely of the latter beneath the forward end portions of said pair of levers, said spring projecting beyond the pair of levers and engaging the latter to normally swing the forward arms thereof upwardly and position the clearer plate in a raised position adjacent the under side of the rake head.

WILLIAM W. BARRACKS.

REFERENCES CITED

The following references are of record in the file of this patent:

UNITED STATES PATENTS

| Number | Name | Date |
| --- | --- | --- |
| 2,049,595 | Swanson | Aug. 4, 1936 |
| 2,179,946 | Miller | Nov. 14, 1939 |
| 1,652,260 | Thompson | Dec. 13, 1927 |
| 623,708 | Ensley | Apr. 25, 1899 |
| 846,486 | Lepley | Mar. 12, 1907 |
| 1,318,079 | Hoag | Oct. 7, 1919 |
| 905,808 | Fruecht et al. | Dec. 1, 1908 |
| 1,648,284 | Seaton | Nov. 8, 1927 |
| 1,981,488 | Wikander et al. | Nov. 20, 1934 |